(12) United States Patent
Bellows (10) Patent No.: US 11,814,247 B2
(45) Date of Patent: Nov. 14, 2023

(54) MODULAR INVENTORY MANAGEMENT SYSTEM

(71) Applicant: ZEBRA TECHNOLOGIES CORPORATION, Lincolnshire, IL (US)

(72) Inventor: David Bellows, Old Westbury, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 227 days.

(21) Appl. No.: 17/005,127

(22) Filed: Aug. 27, 2020

(65) Prior Publication Data
US 2022/0063913 A1    Mar. 3, 2022

(51) Int. Cl.
*B65G 1/137* (2006.01)
*G06M 1/272* (2006.01)

(52) U.S. Cl.
CPC .......... *B65G 1/1373* (2013.01); *G06M 1/272* (2013.01); *B65G 2201/0258* (2013.01); *B65G 2203/0266* (2013.01); *B65G 2203/044* (2013.01)

(58) Field of Classification Search
CPC .......... B65G 1/1373; B65G 2201/0258; B65G 2203/0266; B65G 2203/044
See application file for complete search history.

(56) References Cited

U.S. PATENT DOCUMENTS

| | | | |
|---|---|---|---|
| 5,366,099 A * | 11/1994 | Schmid | A47F 1/126 |
| | | | 211/59.3 |
| 2012/0245969 A1 | 9/2012 | Campbell | |
| 2015/0208830 A1 | 7/2015 | Hardy | |
| 2016/0132822 A1 | 5/2016 | Swafford | |
| 2018/0306958 A1 | 10/2018 | Goss et al. | |
| 2019/0150639 A1 * | 5/2019 | Wittig | A47B 88/969 |
| 2020/0077813 A1 | 3/2020 | Hardy | |

FOREIGN PATENT DOCUMENTS

| | | |
|---|---|---|
| FR | 2952286 A1 | 5/2011 |
| WO | 20190020743 A1 | 1/2019 |

OTHER PUBLICATIONS

International Search Report and Written Opinion for International Application No. PCT/US2021/028197 dated Jul. 27, 2021.
Novelty Search Report for Belgian Patent Application No. 2021/05676 dated Mar. 13, 2022.

* cited by examiner

*Primary Examiner* — Lynn E Schwenning (57) ABSTRACT

A modular inventory management system is disclosed herein that includes a bin module. The bin module may include a module base, a sensor configuration, and a divider. The module base may have a first lateral edge, a second lateral edge, and a top surface that connects the first lateral edge to the second lateral edge. The sensor configuration may be arranged on the module base between the first lateral edge and the second lateral edge. The sensor configuration may include a plurality of sensor elements that are arranged in a single row on a center axis of the module base and configured to sense whether one or more objects are positioned on the top surface of the module base. The divider may be situated at the first lateral edge and may be configured to slide laterally with respect to the module base to adjust a width of the bin module.

20 Claims, 5 Drawing Sheets

MODULAR INVENTORY MANAGEMENT SYSTEM

BACKGROUND

Businesses or organizations may utilize sensor technology to monitor a status or presence of objects (e.g., to detect status changes, theft, and/or removal or addition of retail products on display, inventory, stored resources or equipment, and/or the like). For example, a business may use an array of sensors mounted to a surface of a shelf to monitor objects on the shelf and/or detect whether objects have been removed from or added to the shelf. Objects and/or packaging of the objects may have various shapes and/or sizes. Furthermore, a single shelf or set of shelves of a business may be set up to store or hold various types of objects and/or packages that have the various shapes and/or sizes. Therefore, there is a need for an inventory management system that is adaptable and that provides an accurate representation of statuses of objects on a shelf (and/or a set of shelves) without including an overly complex array of sensors or a large quantity of sensors, which may be costly and/or burdensome to implement.

SUMMARY

In some implementations, a bin module may include a module base having a first lateral edge, a second lateral edge, and a top surface that connects the first lateral edge to the second lateral edge, wherein the module base includes a center axis that is centered between and parallel to the first lateral edge and the second lateral edge; a sensor configuration arranged on the module base between the first lateral edge and the second lateral edge, wherein the sensor configuration includes a plurality of sensor elements that are arranged in a single row on the center axis of the module base and configured to sense whether one or more objects are positioned on the top surface of the module base; and a divider that is situated at the first lateral edge, wherein the divider is configured to slide laterally with respect to the module base to adjust a width of the bin module.

In some implementations, a bin module may include a module base having a first lateral edge, a second lateral edge, and a top surface that connects the first lateral edge to the second lateral edge; a first divider at the first lateral edge of the module base; a second divider at the second lateral edge of the module base; a sensor configuration arranged on the top surface of the module base, wherein the sensor configuration includes sensor elements that are configured to sense an object on the module base; and a lateral adjustment mechanism that is configured to permit a distance between the first divider and the second divider to be adjusted.

In some implementations, an inventory management system may include a support plate that includes a communication bus; and a bin module that is configured to store one or more objects on the support plate, wherein the bin module comprises: a sensor configuration of sensor elements arranged on a center axis of the bin module, wherein the sensor elements are configured to provide information associated with a status of the bin module that is associated with storing the one or more objects, an electrical connector interface that is configured to communicatively couple the sensor elements to the communication bus; and an adjustable divider that is movable to adjust a width of the bin module while maintaining a position of the sensor configuration on the center axis.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

Arrays of sensors can be used on a shelf (or other type of storage space or storage surface) to enable a system to provide and/or obtain information associated with objects on the shelf. Such sensors may include resistive sensors, capacitive sensors, weight sensors, optical sensors, and/or the like that are mounted to a surface of the shelf to permit the sensors to detect the presence of an object (or lack thereof) on the shelf. In some instances, the array of sensors can be distributed on the top surface of the shelf in a pattern (e.g., a two-dimensional pattern) that can enable the system to determine how much of the surface is covered by objects on the shelf, count the number of objects on the shelf, identify the location of the objects on the shelf, and/or the like. However, because objects can be placed anywhere on the surface of the shelf and because a shelf may store various types of objects with different sizes and/or shapes, a broadly distributed and dense array of sensors has been previously required in order to make sure there is always sufficient sensor coverage under each object, regardless of the object's size, shape, or placement. With each sensor only able to detect the presence of an object (or lack thereof) in its immediate vicinity, sensors need to be placed in as many locations as possible in order to cover all possible object sizes and locations. The large number of sensors thereby required has often made the array expensive, impractical, and prohibitive. Increasing the sensor-to-sensor pitch would reduce the total number of sensors and would thereby reduce the cost, but with fewer sensors, the sensing array would be less accurate and less effective since the total coverage area on the shelf surface would be reduced.

For example, if sensors are arranged in a square grid array every 2 inches, the resulting sensor density would be 36 sensors per square foot (6 sensors×6 sensors). This relatively large sensor spacing may not provide sufficient accuracy depending on the characteristics of objects (e.g., shapes, sizes, and/or the like) to be tracked and where on the shelf they could be placed. In order to address this functional deficiency and get more reliable sensing data, if a sensor is instead placed every 1 inch, which is half the distance of the 2 inch example, the resulting sensor density would be 144 sensors per square foot (12 sensors×12 sensors). This increase in sensor density, which would cut the sensor-to-sensor pitch in half, would quadruple the cost for just the sensors themselves. In addition, this increase in the number of sensors would significantly affect the supporting hardware and circuitry needed to operate the sensors, the processing time necessary to cycle through all of the sensor readings, the power required to operate the sensors, and/or the like. Thus, depending on sensor density, there may be an undesirable tradeoff between system accuracy and cost.

Furthermore, if a particular type of object is to be monitored (e.g., an object configured to be stored on a particular portion of the shelf), a subset of the array of sensors must be designated to monitor for that particular type of object. Such a configuration adds complexity to processing sensor readings from the array of sensors and/or managing information associated with the readings due to the relatively large quantity of sensors needed to monitor all types of objects in all possible locations on a surface of the shelf. Further, because objects can be a variety of different sizes and/or shapes, many of the sensors may be redundantly providing sensor readings associated with a same object. Moreover, due to the variety of shapes and sizes, many of the sensors may be in suboptimal positions or unable to detect certain types of objects on the shelf (e.g., because the shapes and/or sizes of the objects and/or packaging do not align with the physical dimensions of the arrays of sensors).

Furthermore, in some instances, objects of various sizes and shapes can be shifted across the surface of a shelf over the course of time (e.g., by consumers while shopping, by managers or representatives of an organization using the inventory management system, and/or the like), which can lead to false detection of the particular type of object because a misplaced object is being detected by the subset of the array of sensors. While certain operations associated with sensor readings can be performed to distinguish between types of objects (e.g., based on identifiers, sizes, shapes, and/or the like), such operations (e.g., image processing, object analysis techniques, object techniques, and/or the like) involve a relatively large quantity of resources and a relatively long amount of time to perform.

According to some implementations described herein, an inventory management system is provided that utilizes one or more adjustable bin modules that can be configured to receive, store, and monitor a status of a variety of different types of objects. This status may include, for example, detecting whether objects are present in the one or more bin modules, counting the number of objects in the one or more bin modules, identifying the locations of objects in the one or more bin modules, determining how much of the top surface of the one or more bin modules is covered by objects, calculating what percentage of the one or more bin modules are full, identifying changes in the one or more bin modules (e.g., addition of objects, subtraction of objects, and/or the like). As described herein, a bin module may be adjustable in that one or more dimensions of the bin module can be increased or decreased using one or more adjustment mechanisms.

Additionally, or alternatively, a bin module, as described herein, may include a sensor configuration that is optimally situated within the bin module relative to a size and/or shape of an object that is to be received in the bin module. As an example, the sensor configuration may include a single row of sensors arranged along a center axis of the bin. This arrangement of sensors is optimal because by being located along a center axis of the bin module, the sensors will also be aligned with the centerlines of the objects placed in the bin module and are therefore optimally positioned to sense the presence of such objects. One or more edge extenders and/or adjustable dividers of the bin module (e.g., that run parallel to the center axis) can be adjusted to establish a width of the bin module. Such a width may be configured based on a dimension of an object that is to be stored in the bin module. For example, the position of the adjustable dividers can be based on the location of the left and right edges of the object to be placed or placed in each bin module. The width of each bin module is therefore scalable and is sized to fit the width of the objects placed in it. Furthermore, the single row of sensors per bin module is maintained along the center axis of the bin module, regardless of its width. This keeps the sensors not just centered in the bin module but also aligned with the object centers, where the sensors are best able to detect the presence (or lack thereof) of an object. Even as the object shapes differ, the sensors will always be positioned where they are most needed (along the centerlines of the objects to be tracked), thereby creating an efficient sensor arrangement. As a further example, for an object with a round footprint, such as a soda can, sensors that are located outside the circle of the round footprint will not be useful since they are not located under the can and are therefore unable to easily detect the can's presence. However, if the sensors are arranged in a line to bisect the can's footprint, the sensor line will always be positioned under a can placed in the bin module. By sizing the bin module's width according to the can's size and positioning the row of sensors along a center axis of the bin module, the row of sensors will thereby be optimally placed for sensing the presence of the can.

Furthermore, the sensor configuration can be independently allocated or designated to detect a status of the bin module and/or a status of objects in the bin module (e.g., a percentage of the sensors that are actively detecting an object in the bin module may correspond to a percentage of a maximum quantity of objects that can fit in the bin module and/or an occupancy of the bin module).

According to some implementations, the bin modules of the inventory management system may be configured to be received within a support plate of a shelf that includes one or more electronic interfaces and one or more mechanical interfaces. Such electronic interfaces may include a power supply line that provides power from a power supply to sensors of the bin modules and/or a communication bus to facilitate communication between the sensors and a backend platform that is configured to manage or maintain information associated with the objects via the readings of the sensors of the bin modules. Such mechanical interfaces may include one or more tracks in the support plate for the bin modules to slide into (e.g., via one or more corresponding rails on the bin modules, and/or the like). Other embodiments may include other types of corresponding mating features in the bin modules and support plate that facilitate arrangement of the bin modules on the support plate.

In this way, an inventory management system is provided that uses bin modules that are configured to adjustably receive and store a variety of types of objects and accurately monitor the status of the objects using an optimally positioned sensor configuration that utilizes relatively fewer sensors than sensor arrays of previous systems. Accordingly, the inventory management system described herein may conserve resources that would otherwise have been wasted using the sensor arrays of previous systems. More specifically, use of the bin modules, as described herein, may conserve hardware resources (e.g., by requiring relatively fewer sensors to monitor a shelf), computing resources (e.g., processor resources, memory resources, and/or the like associated with processing inaccurate, redundant, or unnecessary sensor readings from the sensor arrays), network resources (e.g., bandwidth resources, routing resources, and/or the like associated with communicating inaccurate, redundant, or unnecessary sensor readings of the sensor arrays), and/or power resources (e.g., power used by sensors that provided inaccurate, redundant, or unnecessary sensor readings). Allocation of sensors of the inventory management system is less complex, relative to previous techniques (which required individual assignment of sensors or rows of sensors to an object), because sensors of a sensor configuration can be grouped based on being communicatively coupled within a same module base of a bin module or assigned to a same bin module. Moreover, the bin modules, as described herein, may include adjustable dividers to prevent (or at least reduce a likelihood of) misplacement of objects, thereby improving accuracy with respect to identifying the status of the objects stored in the bin modules.

Figure 1:
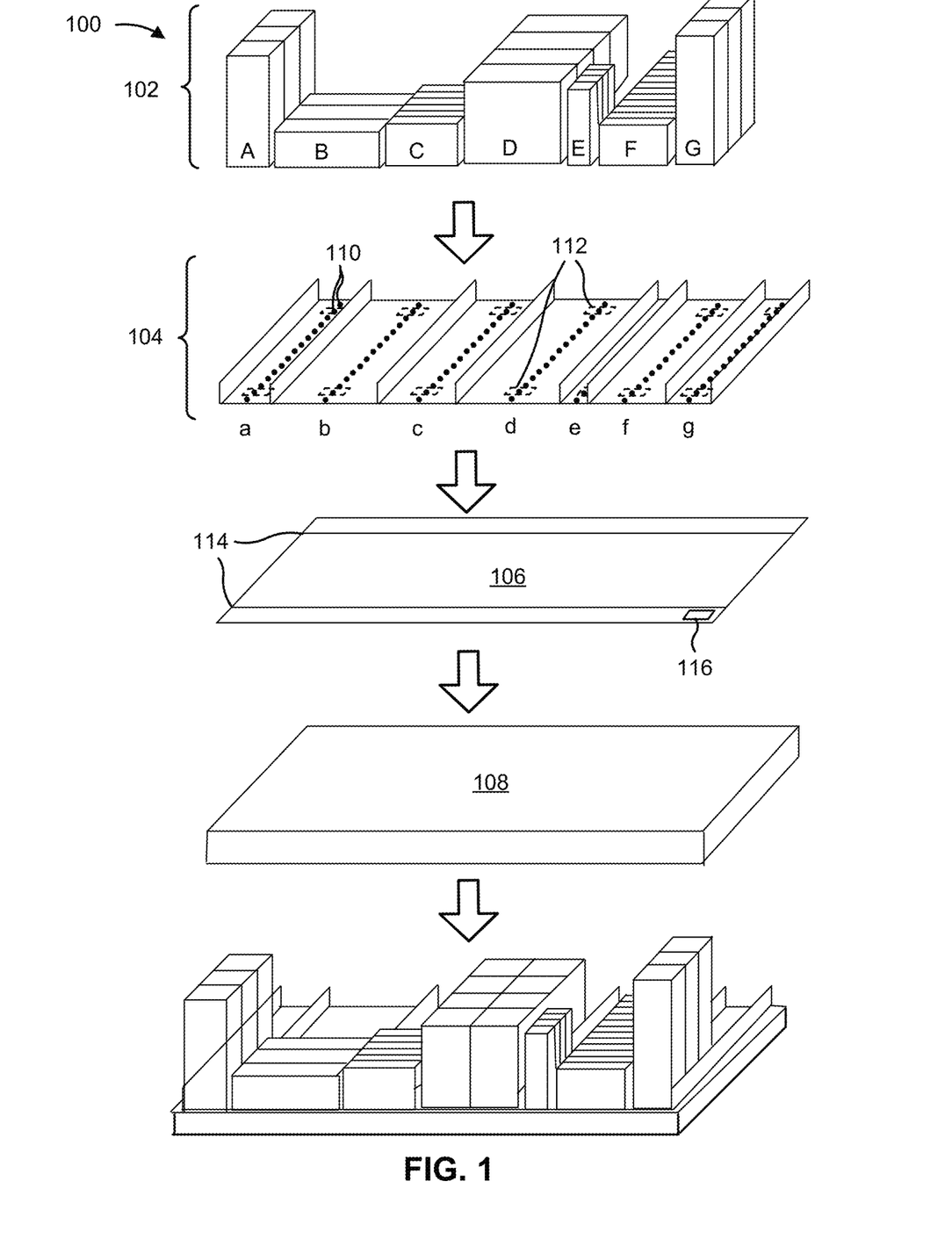
FIG. 1 is a diagram of one or more example implementations described herein.

FIG. 1 is a diagram of an example implementation 100 of an inventory management system. As shown in FIG. 1, the example implementation 100 includes a plurality of objects 102, a plurality of bin modules 104, a support plate 106, and a shelf 108. The plurality of objects 102 may, for example, be merchandise of a business, inventory of a business, equipment for use by a business, and/or the like. The plurality of objects 102 are configured to be received by the plurality of bin modules 104 in an organized manner to facilitate tracking of the plurality of objects 102.

Each of the plurality of bin modules 104, as described herein, is a device or apparatus that is configured to track and store the plurality of objects 102. To track the plurality of objects 102, each of the plurality of bin modules 104 includes a first electrical configuration. The first electrical configuration may include a sensor configuration having a plurality of sensor elements 110, electrical connectors 112, and circuitry that connects the plurality of sensor elements 110 to the electrical connectors 112.

The plurality of sensor elements 110 may include optical sensing elements that are configured to convert light rays (e.g., from ambient light in the environment) into electrical signals. For example, the plurality of sensor elements 110 may include resistive photocells, photodiodes, phototransistors, a combination thereof, and/or the like. Thus, the plurality of sensor elements 110 are capable of detecting changes in light associated with removal, addition, and/or movement of the plurality of objects 102 (e.g., changes in brightness, intensity, and/or the like). In some implementations, the plurality of sensor elements may include one or more resistive sensing elements, capacitive sensing elements, weight sensing elements, and/or the like. To communicate information (e.g., sensor readings) associated with the positioning of the plurality of objects 102, the plurality of sensor elements 110 may transmit the electrical signals via the circuitry and the electrical connectors 112.

The support plate 106 is a substantially planar device that is configured to support and electronically communicate with the plurality of bin modules 104 regarding the positioning of the plurality of objects 102. To facilitate communication with the plurality of bin modules 104 (e.g., communication between the plurality of bin modules 104 and a backend platform of the inventory management system), the support plate 106 includes a second electrical configuration. The second electrical configuration includes a communication bus 114 that is configured to electrically connect (e.g., contact) the electrical connectors 112 to a communication interface (e.g., a hardwired Power over Ethernet (PoE) port, and/or the like) to transmit information from the plurality of sensor elements 110 to a backend platform for storage and/or processing. For example, the electrical connectors 112 may include leads or traces that are configured to be received within a slot that includes the communication bus 114 of the support plate 106. Additionally, or alternatively, the second electrical configuration may electrically connect (e.g., contact) the electrical connectors 112 to a wireless communication interface to enable the system to communicate wirelessly to a backend platform. For example, the wireless communication interface may include a wireless radio (e.g., a Bluetooth radio, long range (LoRa) radio, wireless local area network (WLAN) radio, Zigbee radio, wireless wide area network (WWAN) radio, and/or the like), a transceiver, antenna, and/or the like. The communication interface and related components may be integrated into the support plate 106 or may be in the form of a module that electrically and mechanically attaches to the support plate 106 and can be populated in the inventory management system as needed.

In some implementations, the second electrical configuration may include a power supply line that is coupled to a power supply unit 116. For example, the power supply unit 116 may be a solar cell module, which is configured to supply power to the plurality of sensor elements 110 and support circuitry via the power supply line and the electrical connectors 112. In other examples, the power supply unit 116 may be an energy harvester that utilizes a different technology and/or collects a different form or type of energy to power the plurality of sensor elements 110 and supporting circuitry via the power supply line and the electrical connectors 112. In yet another example, the power supply unit 116 may represent a hard-wired connection to a remote power source (e.g., via PoE, a high voltage line, and/or the like). The power supply unit 116 may be integrated into the support plate 106 or may be in the form of a module that electrically and mechanically attaches to the support plate 106 and can be populated in the inventory management system as needed. In some implementations, the communication bus 114 and power supply line are collocated and can be collectively referred to be reference character 114.

The support plate 106 simplifies the inventory management system and helps to minimize its total cost by making the system much more compatible with the varying existing shelf sizes already in the field. In contrast, previous shelf sensing systems where the sensing functionality is integrated into a plate with fixed dimensions have been limited to deployments onto existing shelves of a comparable overall size. In order for these previous systems to support a realistic variety of shelf sizes (particularly shelf widths) found in places suitable for such an inventory management system, numerous and expensive inventory management system variations, or SKUs, would be required. Furthermore, each integrated SKU size would be burdened with all the electronics of the system, resulting in high inventory carrying costs for the manufacturer of the inventory management system as the multitude of expensive SKUs sit in the warehouse waiting for an order. However, the modular inventory management system disclosed here minimizes the overall cost by minimizing the cost of the component that directly interfaces with the shelf: the support plate 106. By utilizing the support plate 106 as a simple common receptacle for the bin modules 104, it is free of the sensors 110 and the majority of the supporting circuitry, making its manufacture in multiple widths easier and less expensive. Each individual inventory management system assembly can now be easily customized for the objects stocked on a specific shelf by pairing the modular bin modules 104 with the appropriately sized and relatively inexpensive support plate 106. Using the support plate 106 as the medium between the bin modules 104 and existing shelves is therefore how the inventory management system can work with a multitude of existing shelf sizes.

The shelf 108 is a substantially planar support structure. For example, the shelf 108 may be a wooden support structure, a metallic support structure, a plastic support structure, and/or the like. In some implementations, the shelf 108 may be a component of a shelving unit (e.g., one shelf of a set of shelves). The shelf 108 may be configured to support the support plate 106, the plurality of bin modules 104, and the plurality of objects 102. In some embodiments, the relevant features of the support plate 106 can integrated into the shelf 108. That is, the shelf 108 is directly configured to support and electronically communicate with the plurality of bin modules 104 regarding the positioning of the plurality of objects 102. In these embodiments, the support plate 106 is not required.

To assemble the inventory management system for use, a user associated with the business may place (or slide) the support plate 106 on top of the shelf 108. Once positioned, the user may adjacently arrange (or slide) the plurality of bin modules 104 on top of the support plate 106 to receive the plurality of objects 102. For example, the plurality of bin modules 104 may abut one another. To facilitate tracking of the plurality of objects 102, the user may divide the plurality of objects 102 into subsets based on commonalities within the subsets. For example, objects within a subset may have a common size, a common object type, a common object identifier, and/or the like. As another example, objects within a subset may simply be duplicates (e.g., are identical to one another). After forming the subsets, the user may arrange the subsets into rows (e.g., row "A," row "B," row "C," and/or the like) and place each row onto a corresponding bin module 104 (e.g., bin module "a," bin module "b", bin module "c," and/or the like). To ensure an object 102 can be physically received by the bin module 104, the user may adjust a width of the bin module 104 to be substantially equal to a width of the object 102. This width adjustment also ensures an object 102 covers at least one sensor element 110 of a bin module 104. In some implementations, the support plate 106 and/or the shelf 108 may be pitched to cause gravity to pull the objects toward an end of the shelf 108 (e.g., an end toward an aisle traversed by consumers while shopping in the business).

To further illustrate the benefit of positioning the sensor elements 110 where they will be most efficiently utilized, in one example, objects 102 may be about 3 inches wide. To receive these objects 102, the bin modules 104 may be set to a corresponding width of about 3 inches. Per lateral foot, the inventory management system may therefore accommodate a quantity of 4 bin modules 104. Based on a sensor-to-sensor spacing of the single row of sensor elements 110 being about 1 inch, then the inventory management system would include approximately 48 sensor elements 110 per square foot. By comparison, previous systems using a 1-inch sensor pitch in both the lateral (width) and depth directions would require 144 sensor elements (12×12), which is 3 times the number of sensor elements compared to the 48 sensor elements of the example embodiment. In addition to the total sensor element cost savings, the current system will also have a natural cost savings associated with the supporting printed circuit boards (PCBs) since four 12-inch long PCB strips, which can be about less than 1 inch wide each to support the sensor rows in the 4 bin modules, will cost less than one large 12 inch×12 inch PCB. Furthermore, as the objects 102 get wider than 3 inches, the cost density goes down even further since the number of sensor elements required per bin module 104 is independent of the object width. For example, for objects 102 that are about 6 inches wide, there are still 12 sensor elements 110 in the single row of sensors in each bin module 104, and with two 6-inch bin modules across totaling 12 inches, only 24 sensor elements 110 are required per square foot. In addition, with fewer sensor elements 110 compared to previous systems, the required power is reduced and the system latency is shortened.

In use, once an object 102 is removed from a bin module 104 (e.g., by a shopper selecting the object 102 to purchase), one or more sensor elements 110 of the bin module 104 provide one or more sensor readings that identify an amount of light (or a change in light (e.g., from dark to light)) sensed by the one or more sensor elements 110. Similarly, once an object 102 is added to a bin module 104 (e.g., during restocking), one or more sensor elements 110 of the bin module 104 provide one or more sensor readings that identify an amount of light (or a change in light (e.g., from light to dark)) sensed by the one or more sensor elements 110. For example, the one or more sensor elements 110 may transmit the sensor reading and/or information associated with the change to a backend platform (e.g., a control module of the inventory management system) via the electrical connectors 112 and/or the communication bus 114 of the support plate 106. The communication bus 114, in turn, may transmit the sensor reading and/or the information to the backend platform for processing and/or storage. In some implementations, the individual bin modules of the plurality of bin modules 104 may be configured with a controller to independently detect the status or status change of a corresponding bin module.

During the deployment of the inventory management system, the location of each support plate 106 within the venue is recorded. Bin modules 104 and support plates 106 can each have a unique identifier such that when each bin module 104 is physically and/or electrically paired with a support plate 106, this association will identify each bin module's location by setting it to match the support plate's location. This pairing may be achieved by, for example, scanning a bar code on the support plate 106 and scanning a bar code on the bin module 104 at the time the bin module 104 is assembled to the support plate 106. Alternatively, this pairing may be more passive and may be achieved by the bin module 104 electronically communicating its unique identifier to the respective support plate 106 when the inventory management system is first powered on. Furthermore, the locations of the objects 102 that are stored in the bin modules 104 will be known based on their association with the bin modules 104. This association may be achieved by, for example, scanning a bar code on the support plate 106 and/or a bar code on the bin module 104 that the objects 102 are being placed into and scanning the bar code on the object or objects 102 at the time the bin module 104 is populated with the object or objects 102. An example embodiment of the output of such an inventory management system can include: support plate #123 with bin modules "a" through "g" are located in store #1000, aisle 5, bay 2R, shelf 3 and currently contain products "A" through "G," respectively, with inventory counts of 3, 3, 6, 4, 4, 12, and 3, respectively.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, differently arranged devices than those shown in FIG. 1. Furthermore, two or more devices shown in FIG. 1 may be implemented within a single device, or a single device shown in FIG. 1 may be implemented as multiple, distributed devices.

Figure 2A:
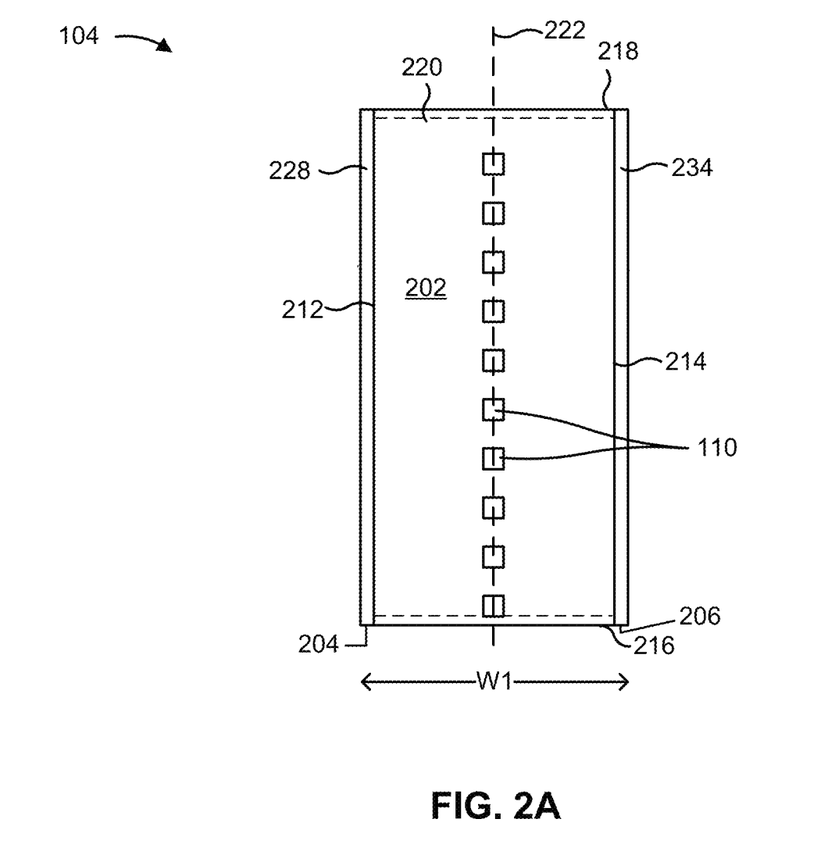
FIGS. 2A-2B are diagrams of an example implementation of a bin module described herein.
Figure 2B:
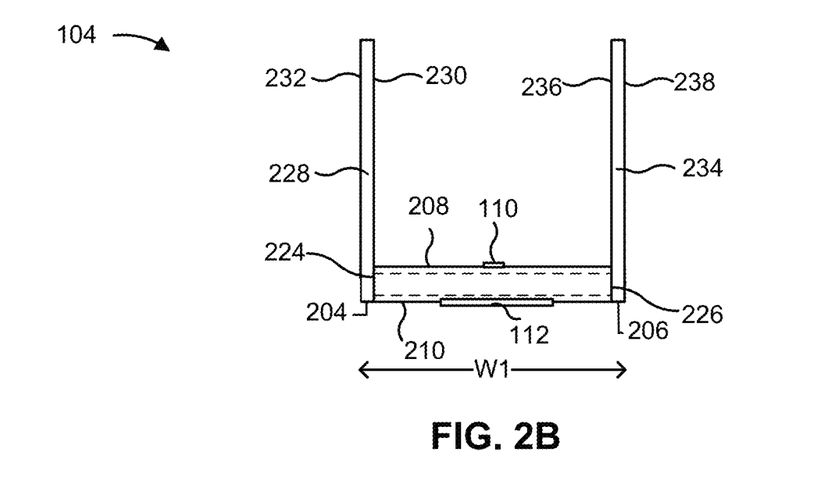

FIGS. 2A-2B are diagrams of a bin module 104 (e.g., of the plurality of bin modules 104), according to one or more aspects of the present disclosure. FIG. 2A is a top view of the bin module 104 in a contracted state. FIG. 2B is a front view of the bin module 104 in the contracted state.

As shown in FIGS. 2A-2B, the bin module 104 includes a module base 202, a first edge extender 204, and a second edge extender 206. The module base 202 includes a top surface 208, a bottom surface 210, a first lateral surface 212, a second lateral surface 214 that opposes the first lateral surface 212, a front surface 216 that connects the first lateral surface 212 to the second lateral surface 214, and a rear surface 218 that opposes the front surface 216. The first lateral surface 212, the second lateral surface 214, the front surface 216, and the rear surface 218 together connect the top surface 208 to the bottom surface 210 to enclose a hollow interior 220 within the module base 202. The top surface 208 includes the plurality of sensor elements 110, which are shown in the example of FIGS. 2A and 2B as being arranged in a single row along a center axis 222 of the module base 202. The first lateral surface 212 includes a first opening 224 that communicates with the hollow interior 220 of the module base 202. The second lateral surface 214, in turn, includes a second opening 226 that communicates with the hollow interior 220 of the module base 202. The first opening 224 and second opening 226 may correspond to slide tracks that are configured to receive slide rails, as described herein. The bottom surface 210 includes the electrical connectors 112, which are configured to electronically communicate with the plurality of sensor elements 110 via the circuitry.

The first edge extender 204 may include a first divider 228 that is configured to move laterally (e.g., via slide rails that are mechanically slidable within slide tracks of the hollow interior 220) away from the module base 202 to allow the bin module 104 to accommodate objects 102 having different sizes (e.g., different widths). The first divider 228 has a first inner surface 230 and a first outer surface 232 that opposes the first inner surface 230. The first inner surface 230 is configured to abut the first lateral surface 212 of the module base 202 when the bin module 104 is in the contracted state.

Similarly, the second edge extender 206 may include a second divider 234 that is configured to move laterally away (e.g., via slide rails and slide tracks, as described herein) from the module base 202 to allow the bin module 104 to accommodate objects 102 having different sizes (e.g., different widths). The second divider 234 has a second inner surface 236 and a second outer surface 238 that opposes the second inner surface 236. The second inner surface 236 is configured to abut the second lateral surface 214 of the module base 202 when the bin module 104 is in the contracted state.

The bin module 104 may be made primarily of any suitable material, such as metal, plastic, and/or the like. As shown in FIGS. 2A-2B, the bin module 104, in the contracted state, may have a width "W1," which corresponds to a distance between the first outer surface 232 of the first divider 228 and the second outer surface 238 of the second divider 234. The width "W1" may be adjustable between any preconfigured range (e.g., a range that corresponds to sizes of objects that are to be stored in the bin module 104).

It should be understood that while the width "W1" of the bin module 104 is described as being configured based on a dimension of an object 102 that is to be stored in the bin module or may be substantially equal to a width of an object 102, the thickness of the first divider 228 (e.g. the distance between the first divider's first inner surface 230 and the first divider's first outer surface 232) and the thickness of the second divider 234 (e.g. the distance between the second divider's second inner surface 236 and the second divider's second outer surface 238) are taken into account. That is, an object 102 must fit between the first divider's first inner surface 230 and the second divider's second inner surface 236, and the overall width "W1" of the bin module 104 can be equal to this distance plus the thickness of the first divider plus the thickness of the second divider. For simplicity, since both divider thicknesses are constant, the term "width" whenever referred to the bin module, takes this offset into account.

As indicated above, FIGS. 2A-2B are provided as an example. Other examples may differ from what is described with regard to FIGS. 2A-2B.

Figure 3A:
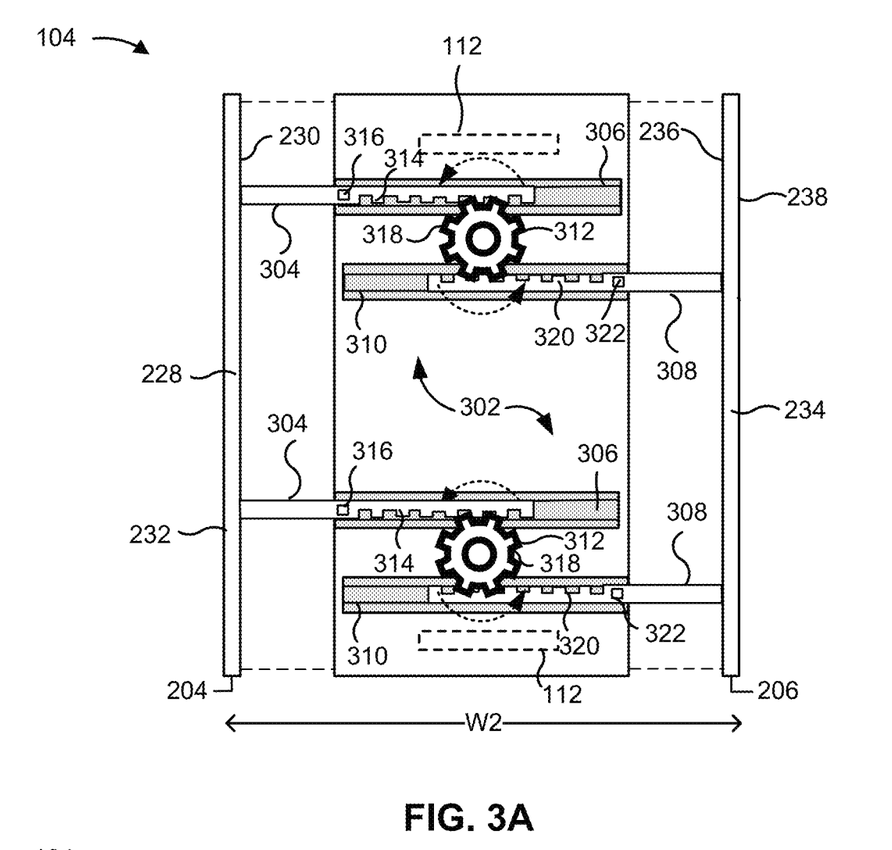
FIGS. 3A-3B are diagrams of an example implementation of the bin module of FIGS. 2A-2B.
Figure 3B:
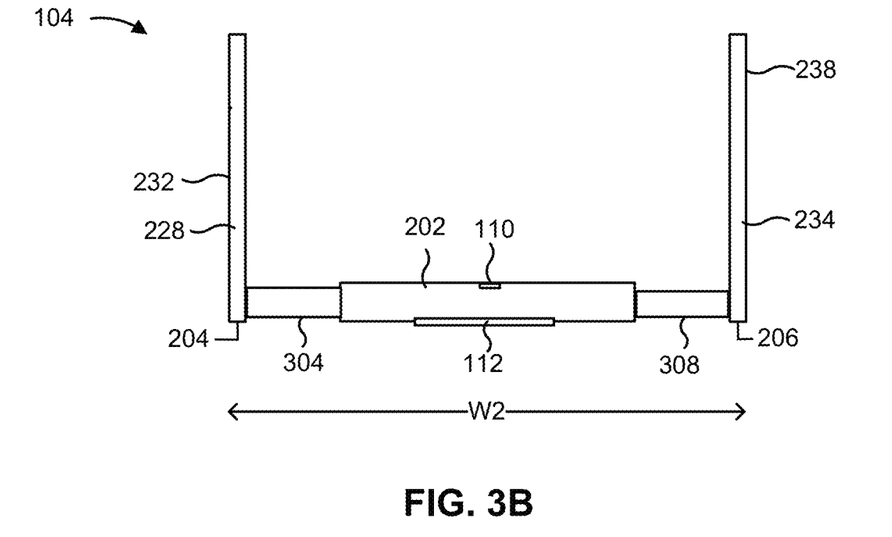

FIGS. 3A-3B are diagrams of the bin module 104, according to one or more aspects of the present disclosure. FIG. 3A is a top interior view of the bin module 104 in a first expanded state. FIG. 3B is a front view of the bin module 104 in the first expanded state.

As shown in FIGS. 3A-3B, to permit the first edge extender and the second edge extender to expand laterally, the bin module 104 includes a first lateral adjustment mechanism 302. The first lateral adjustment mechanism 302 includes a first set of slide rails 304, a first set of slide tracks 306, a second set of slide rails 308, a second set of slide tracks 310, and a set of gears 312. The first set of slide rails 304, which extend from a lower portion of the first inner surface 230 of the first divider 228 or an associated inner surface of the first edge extender 204, are configured to be slidably received by the first set of slide tracks 306, which are provided (e.g., as slots) in the hollow interior 220 of the module base 202. Each of the first set of slide rails 304 includes a first plurality of teeth 314 and a first stop element 316. The first plurality of teeth 314 are configured to engage gear teeth 318 of the set of gears 312, which are provided within the hollow interior 220 of the module base. Each of the set of gears may be configured to rotate about a rotational axis that is perpendicular to the center axis 222 and/or a lateral plane of the module base 202. The first stop element 316 is configured to prevent the first edge extender 204 from being separated from the module base 202 via the first opening 224.

Similarly, the second set of slide rails 308, which extend from a lower portion of the second inner surface 236 of the second divider 234 or an associated inner surface of the second edge extender 206, are configured to be slidably received by the second set of slide tracks 310, which are provided in the hollow interior 220 of the module base 202.

Each of the second set of slide rails 308 includes a second plurality of teeth 320 and a second stop element 322. The second plurality of teeth 320 are configured to engage the gear teeth 318 of the set of gears 312. The second stop element 322, in turn, is configured to prevent the second edge extender 206 from being separated from the module base 202 via the second opening 226.

By utilizing the first lateral adjustment mechanism 302, the bin module 104 may be symmetrically expanded to maintain the plurality of sensor elements 110 in a centered position with respect to the first divider 228 (or the first edge extender 204) and the second divider 234 (or the second edge extender 206). For example, the plurality of sensor elements 110 may remain in the sensor configuration along the center axis 222, which is configured to remain equally, within a tolerance threshold (e.g., a manufacturing tolerance, a standard tolerance, and/or the like), between the first divider 228 and the second divider 234. In other words, the first lateral adjustment mechanism 302 is configured to adjust the position of the first edge extender 204 (having the first divider 228) and the position of the second edge extender 206 (having second divider 234) by equal distances in opposite directions away from the center axis 222. As a result, the plurality of sensor elements 110 may be optimally positioned to detect changes in positions of the plurality of objects 102, additions to the plurality of objects 102, subtractions from the plurality of objects 102, and/or the like. As shown in FIGS. 3A-3B, the bin module 104, in the first expanded state, may have a width "W2," which corresponds to a distance between the first outer surface 232 of the first divider 228 and the second outer surface 238 of the second divider 234. The width "W2" may be adjustable between any preconfigured range. This includes symmetrically contracting the bin module 104, for example from a width "W2" to a width "W1," where the lateral adjustment mechanism 302 adjusts the position of the first edge extender 204 with first divider 228 and the position of the second edge extender 206 with second divider 234 by equal distances in opposite directions inward and toward the center axis 222.

While the first lateral adjustment mechanism 302 has been described as permitting symmetric expansion of the bin module 104, it should be understood that the manner in which the bin module 104 expands depends on how the bin module 104 is held by a user. In other words, movement of the components of the bin module 104 is relative. For example, if the user holds the first divider 228 in place while pulling the second divider 234 away from the first divider 228, the second divider 234 will travel a distance while the plurality of sensor elements 110 travel half of the distance. In such an example, the module base 202 and the second edge extender 206 will move while the first edge extender 204 will not. As another example, if the user holds the module base 202 while pulling the second divider 234 away from the first divider 228, the first divider 228 and the second divider 234 will travel an equal distance. In such an example, the first edge extender 204 and the second edge extender 206 will move while the module base 202 (along with the plurality of sensor elements 110) will not.

As indicated above, FIGS. 3A-3B are provided as an example. Other examples may differ from what is described with regard to FIGS. 3A-3B. The number and arrangement of devices shown in FIGS. 3A-3B are provided as an example. In practice, there may be additional devices, fewer devices, different devices, differently arranged devices than those shown in FIGS. 3A-3B. Furthermore, two or more devices shown in FIGS. 3A-3B may be implemented within a single device, or a single device shown in FIGS. 3A-3B may be implemented as multiple, distributed devices. In some implementations, the first lateral adjustment mechanism 302 may include additional slide rails, slide tracks, and/or gears, fewer slide rails, slide tracks, and/or gears, a different arrangement of slide rails, slide tracks, and/or gears, and/or the like. For example, one or more slide rails and one or more slide tracks may be provided on a first substantially planar element that extends from the first divider 228. One or more corresponding slide tracks and one or more corresponding slide rails may be provided on a second substantially planar element that extends from the second divider 234. One or more gears may be provided between the first planar element and the second planar element to allow the first divider 228 and the second divider 234 to expand and/or contract in a symmetric manner. In such an implementation, similar to that described above, the one or more slide rails are configured to slide within the one or more corresponding slide tracks, and the one or more slide tracks are configured to slidably receive the one or more corresponding slide rails. By including the first substantially planar element in the first edge extender 204 and the second substantially planar element in the second edge extender 206, the bin module 104 may have a more robust, supportive structure.

Figure 4A:
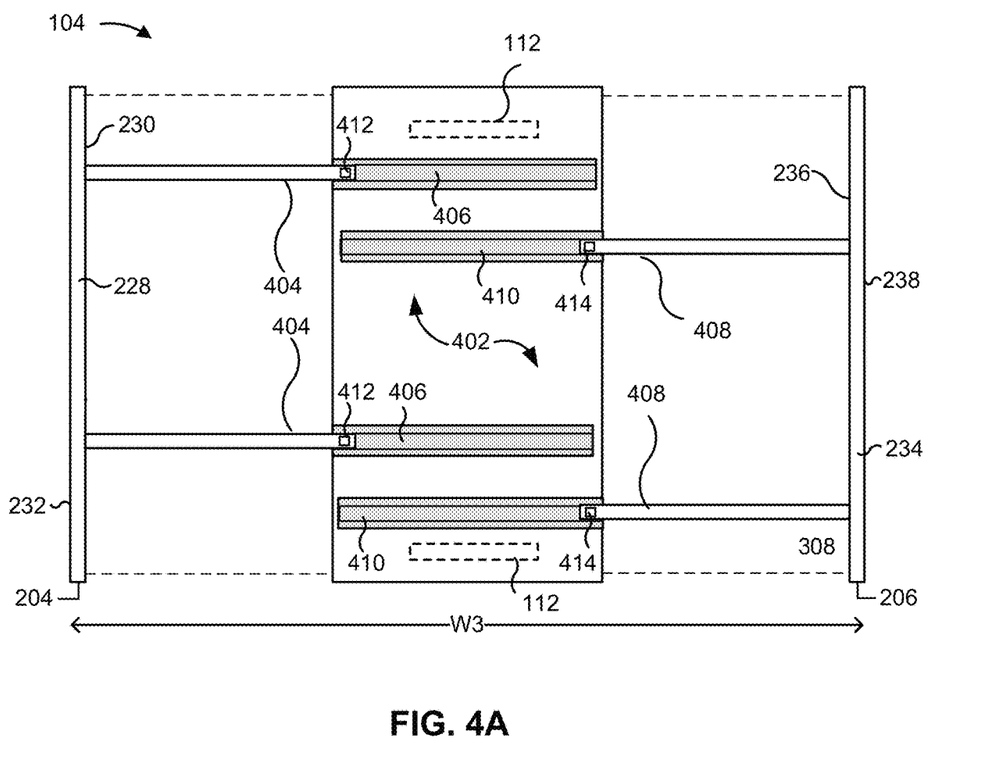
FIGS. 4A-4B are diagrams of another example implementation of the bin module of FIGS. 2A-2B.
Figure 4B:
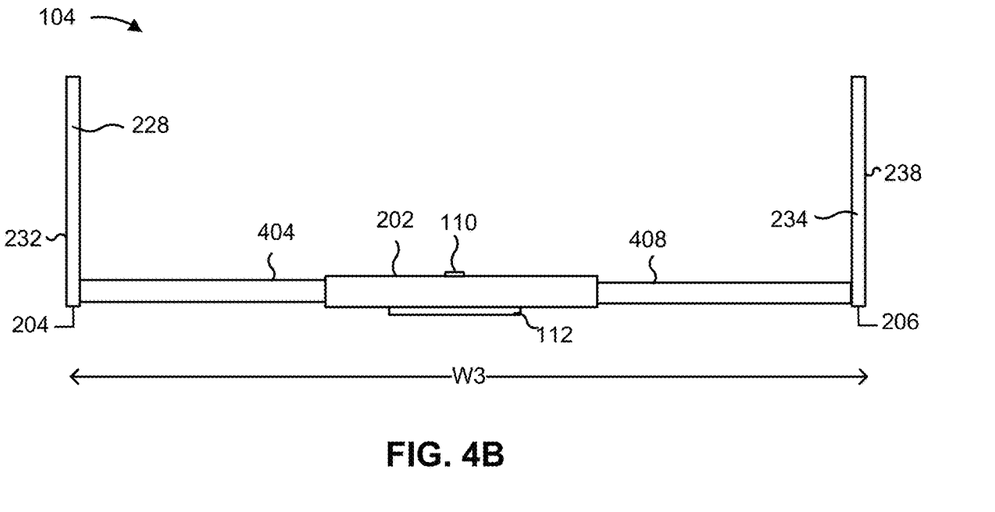

FIGS. 4A-4B are diagrams of the bin module 104, according to one or more aspects of the present disclosure. FIG. 4A is a top interior view of the bin module 104 in a second expanded state. FIG. 4B is a front view of the bin module 104 in the second expanded state.

As shown in FIGS. 4A-4B, to permit the first edge extender 204 and the second edge extender 206 to expand laterally, the bin module 104 includes a second lateral adjustment mechanism 402. The second lateral adjustment mechanism 402 includes a first set of slide rails 404, a first set of slide tracks 406, a second set of slide rails 408, and a second set of slide tracks 410. The first set of slide rails 404, which extend from a lower portion of the first inner surface 230 of the first divider 228 or an associated inner surface of the first edge extender 204, are configured to be slidably received by the first set of slide tracks 406, which are provided in the hollow interior 220 of the module base 202. Each of the first set of slide rails 404 includes a first stop element 412, which is configured to prevent the first edge extender 204 from being separated from the module base 202 via the first opening 224. Similarly, the second set of slide rails 408, which extend from a lower portion of the second inner surface 236 of the second divider 234 or an associated inner surface of the second edge extender 206, are configured to be slidably received by the second set of slide tracks 410, which are provided in the hollow interior 220 of the module base 202. Each of the second set of slide rails 408 includes a second stop element 414, which is configured to prevent the second edge extender 206 from being separated from the module base 202 via the second opening 226.

By utilizing the second lateral adjustment mechanism 402, the first edge extender 204 and the second edge extender 206 may be independently expanded and/or contracted with respect to the module base 202. Because the module base 202 does not include gears, the bin module of FIGS. 4A-4B may have a greater range of expansion and thus accommodate a wider variety of objects 102. For example, as shown in FIGS. 4A-4B, the bin module 104, in the second expanded state, may have a width "W3," which corresponds to a distance between the first outer surface 232 of the first divider 228 and the second outer surface 238 of the second divider 234. The width "W3" may be in a range from approximately 4.5 inches to approximately 10.5 inches. Other sizes of the bin module 104 are possible.

As indicated above, FIGS. 4A-4B are provided as an example. Other examples may differ from what is described with regard to FIGS. 4A-4B. The number and arrangement of devices shown in FIGS. 4A-4B are provided as an example. In practice, there may be additional devices, fewer devices, different devices, differently arranged devices than those shown in FIGS. 4A-4B. Furthermore, two or more devices shown in FIGS. 4A-4B may be implemented within a single device, or a single device shown in FIGS. 4A-4B may be implemented as multiple, distributed devices. For example, in some implementations, the second lateral adjustment mechanism 402 may include additional slide rails and/or slide tracks, fewer slide rails and/or slide tracks, a different arrangement of slide rails and/or slide tracks, and/or the like. For example, similar to that described above, one or more slide rails and one or more slide tracks may be provided on a first substantially planar element that extends from the first divider 228. One or more corresponding slide tracks and one or more corresponding slide rails may be provided on a second substantially planar element that extends from the second divider 234. In such an implementation, similar to that described above, the one or more slide rails are configured to slide within the one or more corresponding slide tracks, and the one or more slide tracks are configured to slidably receive the one or more corresponding slide rails. By including the first substantially planar element in the first edge extender 204 and the second substantially planar element in the second edge extender 206, the bin module 104 may have a more robust, supportive structure. As a further example, the lateral adjustment mechanism 402 may include one or more components (e.g., one or more gears, one or more sets of gear teeth, and/or the like) that link adjustment of at least one of the first edge extender 204 or the second edge extender 206 with a position of the plurality of sensor elements 110.

Figure 5:
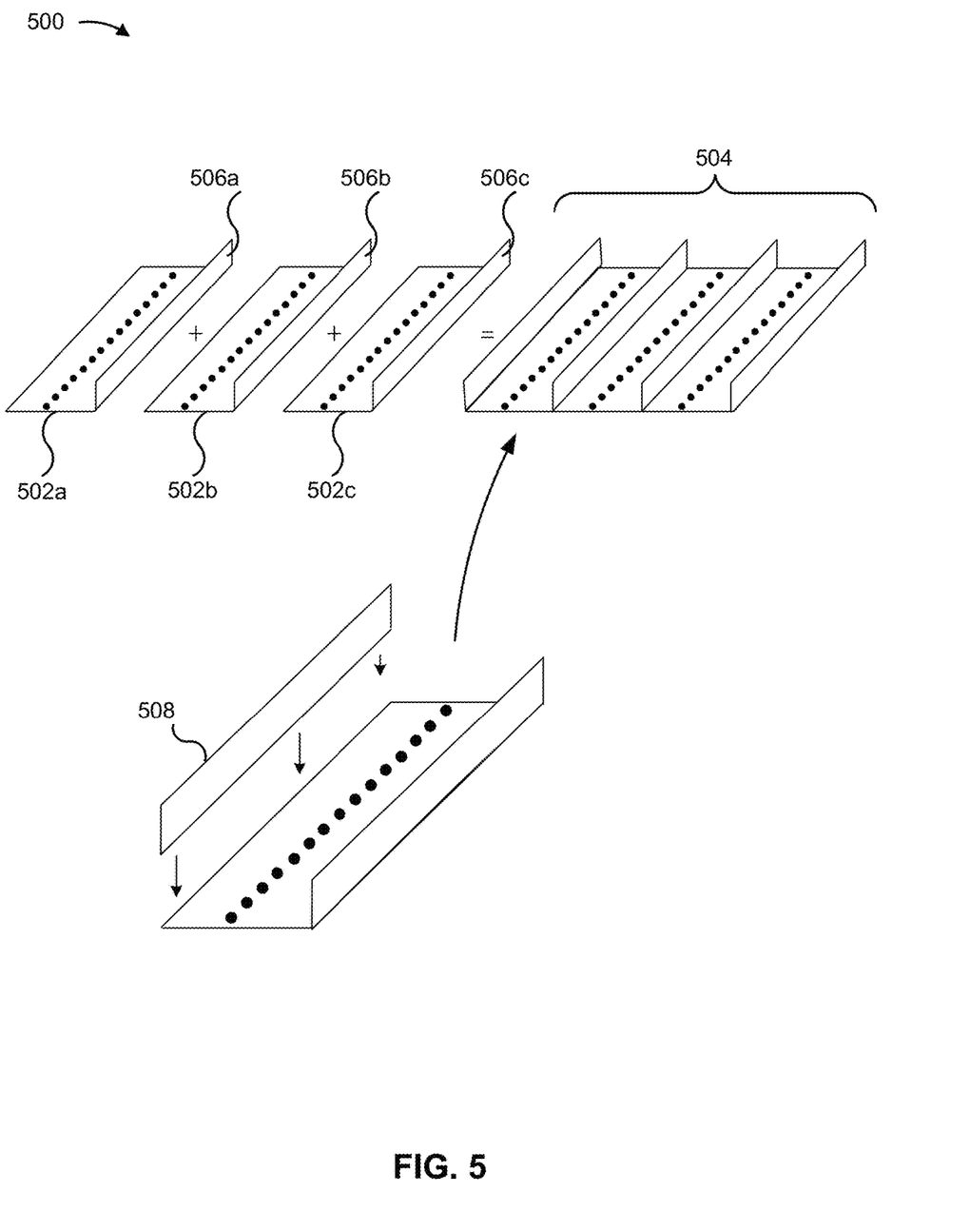
FIG. 5 is a diagram of an example of one or more implementations of a bin module described herein.

FIG. 5 is a diagram of an example 500 of one or more implementations of a bin module described herein. As shown in example 500, a plurality of bin modules 502a, 502b, and 502c (which may correspond to bin module 104 and may be referred to collectively in connection with example 500 as the "bin modules 502") can be combined to form a bin module assembly 504. The bin modules 502 may each have a single adjustable divider 506a, 506b, and 506c, respectively, which are functionally shared with an adjacent bin module. For example, the adjustable divider 506a defines the second divider 234 for the bin module 502a as well as the first divider 228 for the bin module 502b. Thus, the bin module 502a may abut bin module 502b, and the adjustable divider 506a may be configured to divide a storage space of the bin module 502a and a storage space of the bin module 502b. In this way, multiple adjustable dividers may not be required for each individual bin module when forming a bin module assembly on a shelf, thereby reducing an amount of material and/or hardware required to form a bin module, as described herein, or a bin module assembly.

As further shown in FIG. 5, one or more of the bin modules 502 may be configured to receive a detachable adjustable divider 508. For example, the detachable adjustable divider 508 may be attached to the end of the bin module 502a to complete the bin module assembly 504 and/or prevent objects from sliding out from the bin module 502a (or bin module assembly 504). The detachable adjustable divider 508 may use one or more attachment mechanisms (e.g., fasteners, bolts, pegs, receiving holes, snaps, threaded holes, adhesive, and/or the like) that permit the detachable adjustable divider 508 to be attached and/or detached from the bin module 502a. As a further example, to allow for additional flexibility in assembling the bin module assembly 504, any of the adjustable dividers 506a, 506b, and 506c may be similarly detachable from their respective edge extenders (e.g., via fasteners, bolts, pegs, receiving holes, snaps, threaded holes, adhesive, and/or the like).

As indicated above, FIG. 5 is provided as an example. Other examples may differ from what is described with regard to FIG. 5.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A bin module, comprising:
   a module base having a first lateral edge, a second lateral edge, a top surface that connects the first lateral edge to the second lateral edge, and a bottom surface that is opposite the top surface,
   wherein the module base includes a center axis that is centered between and parallel to the first lateral edge and the second lateral edge and the bottom surface of the module base is positioned on a top surface of a support plate;
   a sensor configuration arranged on the top surface of the module base between the first lateral edge and the second lateral edge,
   wherein the sensor configuration includes a plurality of sensor elements that are arranged in a single row on the center axis of the module base and configured to sense whether one or more objects are positioned on the top surface of the module base; and
   a divider that is situated at the first lateral edge,
   wherein the divider is configured to slide laterally with respect to the module base to adjust a width of the bin module.

2. The bin module of claim 1, further comprising:
   an edge extender that includes the divider and is associated with the first lateral edge,
   wherein a position of the edge extender defines a position of the divider; and
   a lateral adjustment mechanism that facilitates adjustment of the position of the edge extender relative to the module base.

3. The bin module of claim 2, wherein the edge extender is a first edge extender, the divider is a first divider, and the bin module further comprises:
   a second edge extender that includes a second divider and is associated with the second lateral edge,
   wherein the lateral adjustment mechanism is configured to adjust a position of the second edge extender relative to the module base.

4. The bin module of claim 3, wherein the lateral adjustment mechanism is configured to equidistantly adjust the position of the first edge extender and the position of the second edge extender in opposite directions, relative to the center axis, to allow the plurality of sensor elements to remain centered between the first divider and the second divider.

5. The bin module of claim 1, wherein the plurality of sensor elements include an optical sensing element that is configured to sense an object positioned over the optical sensing element based on an amount of light sensed by the optical sensing element.

6. The bin module of claim 1, wherein the divider is a first divider, the bin module further comprising:
   a second divider that is situated on the second lateral edge,
   wherein a position of the second divider is adjustable relative to the module base.

7. The bin module of claim 1, further comprising:
   an electrical connector interface,
   wherein the electrical connector interface is configured to communicatively couple the plurality of sensor elements to the support plate via a communication bus.

8. The bin module of claim 7, wherein electrical connectors of the electrical connector interface are positioned on the bottom surface of the module base that is opposite the top surface of the module base,
   wherein the electrical connectors are configured to be communicatively coupled to the communication bus,
   wherein the communication bus is associated with the support plate that is to receive the bin module to store the one or more objects.

9. A bin module, comprising:
   a module base having a first lateral edge, a second lateral edge, a top surface that connects the first lateral edge to the second lateral edge, and a bottom surface that is opposite the top surface;
   wherein the bottom surface of the module base is positioned on a top surface of a support plate;
   a first divider at the first lateral edge of the module base;
   a second divider at the second lateral edge of the module base;

a sensor configuration arranged on the top surface of the module base, wherein the sensor configuration includes sensor elements that are configured to sense an object on the module base; and a lateral adjustment mechanism that is configured to permit a distance between the first divider and the second divider to be adjusted.

10. The bin module of claim 9, wherein the sensor elements are configured to be aligned, within the sensor configuration, on a center axis of the module base.

11. The bin module of claim 9, wherein the lateral adjustment mechanism is configured to maintain a position of the sensor configuration along a center axis that is equally, within a tolerance threshold, between the first divider and the second divider, wherein the center axis of the sensor configuration is parallel to the first lateral edge and the second lateral edge.

12. The bin module of claim 9, wherein the lateral adjustment mechanism comprises:

a set of slide rails attached to the first divider and the second divider; and a set of slide tracks arranged in a hollow interior of the module base, wherein the set of slide tracks are configured to receive the set of slide rails, wherein slide rails of the set of slide rails are mechanically slidable within corresponding slide tracks of the set of slide tracks.

13. The bin module of claim 12, wherein the lateral adjustment mechanism further comprises:

a gear that is configured to engage a first slide rail of the set of slide rails, and a second slide rail of the set of slide rails, wherein the first slide rail is connected to the first divider and the second slide rail is connected to the second divider, and wherein the gear has a rotational axis that is perpendicular to a center axis of the module base.

14. The bin module of claim 9, wherein the module base comprises:

an electrical connector interface that is configured to connect to a communication bus of the support plate; and circuitry that is configured to communicatively couple the sensor elements to the electrical connector interface.

15. An inventory management system, comprising:

a support plate that includes a communication bus; and a bin module positioned on a top surface of the support plate, the bin module configured to store one or more objects on the support plate, wherein the bin module comprises:

a sensor configuration of sensor elements arranged on a center axis of the bin module, wherein the sensor elements are configured to provide information associated with a status of the bin module that is associated with storing the one or more objects;

an electrical connector interface that is configured to communicatively couple the sensor elements to the communication bus; and an adjustable divider that is movable to adjust a width of the bin module while maintaining a position of the sensor configuration arranged on the center axis.

16. The inventory management system of claim 15, wherein the bin module is a first bin module, and the first bin module is configured to abut a second bin module positioned on the top surface of the support plate, wherein the adjustable divider is configured to divide a storage space of the first bin module and a storage space of the second bin module.

17. The inventory management system of claim 15, wherein the adjustable divider is attached to an edge extender that is movable relative to the sensor configuration via a lateral adjustment mechanism of the bin module.

18. The inventory management system of claim 15, wherein the support plate further includes a power supply unit and an associated power line, wherein the electrical connector interface is configured to communicatively couple the sensor elements to the power supply line to permit the sensor elements to be powered by the power supply unit via the power supply line.

19. The inventory management system of claim 18, wherein at least one of the power supply unit or a communication interface is a module that is electrically and mechanically attached to the support plate.

20. The inventory management system of claim 15, wherein the sensor elements comprise optical sensor elements and the information comprises:

optical measurements of light sensed by the optical sensor elements, wherein the optical measurements are configured to indicate an occupancy of the bin module that corresponds to a quantity of the one or more objects being stored in the bin module.

* * * * *